United States Patent [19]

Yokoyama et al.

[11] Patent Number: 4,723,600

[45] Date of Patent: Feb. 9, 1988

[54] HEAT EXCHANGER

[75] Inventors: Shoichi Yokoyama; Makoto Obata, both of Shiga; Hiroyoshi Tanaka, Kyoto; Yoshiyuki Tsuda, Suita; Kaoru Kato, Otsu; Shigeo Aoyama, Higashiosaka, all of Japan

[73] Assignees: Matsushita Refrigeration Company; Matsushita Electric Industrial Co., Ltd., both of Osaka, Japan

[21] Appl. No.: 859,036

[22] Filed: May 2, 1986

[30] Foreign Application Priority Data

| May 10, 1985 | [JP] | Japan | 60-99897 |
| May 10, 1985 | [JP] | Japan | 60-99898 |
| Jul. 24, 1985 | [JP] | Japan | 60-163443 |
| Sep. 5, 1985 | [JP] | Japan | 60-196303 |

[51] Int. Cl.$^4$ .............................................. F28D 1/02
[52] U.S. Cl. .................................. 165/151; 165/150
[58] Field of Search .................... 165/151, 152, 150

[56] References Cited

U.S. PATENT DOCUMENTS 2,512,540  6/1950  Friedman ........................ 165/151 X
4,328,861  5/1982  Cheong et al. ...................... 165/151

FOREIGN PATENT DOCUMENTS 1521499  4/1968  France ................................ 165/151
130596  10/1981  Japan ................................. 165/151
82690  5/1982  Japan .................................. 165/151

Primary Examiner—William R. Cline
Assistant Examiner—Peggy Neils
Attorney, Agent, or Firm—Stevens, Davis, Miller & Mosher

[57] ABSTRACT

Disclosed is a heat exchanger arranged such that a plurality of groups of cutouts are formed on the surfaces of flat fins as between vertically adjacent heat transfer tubes by providing a plurality of cutouts, including two openings extending transverse to the direction of the air flow and two legs nonparallel with said direction of the air flow, on the front and reverse sides of the flat fins. This arrangement remarkably reduces the heat resistance between the air and the fin surfaces. Since the plurality of cutouts or the plurality of groups of cutouts are formed in the identical configuration, maintenance of a mold can be facilitated.

9 Claims, 17 Drawing Figures

HEAT EXCHANGER

BACKGROUND OF THE INVENTION

1. FIELD OF THE INVENTION:

The present invention relates to a heat exchanger used in an air-conditioner, a refrigerator or the like and adapted to transmit heat between fluids.

2. DESCRIPTION OF THE PRIOR ART:

As shown in FIG. 1, this type of conventional heat exchanger generally includes heat transfer tubes 2 made of copper and the like connected to each other by means of U-bends and fins 1 made of aluminum or the like, and is constructed such that a fluid flowing through the heat transfer tubes 2 and air flowing between the fins 1 effect heat exchange.

In recent years, there has been a demand for such types of heat exchanger to be made compact and to have high performance. However, since the speed of air flow between adjacent fins is suppressed to a low level with a view to reducing noises and for other reasons, the fin surfaces on the air side involves a very much higher heat resistance than the inner surfaces of the tubes does. For this reason, there are taken measures which are to enlarge a fin surface area so as to reduce the difference in heat resistance between the fin surfaces and the inner peripheral side of the tubes. However, there are limitations on such enlargement on the fin surface area, and the heat resistance on the fin surface-side still substantially exceeds that of the inner peripheral side of the tubes.

For this reason, attempts have been made in recent years to work the fin surfaces in such a manner as to reduce the heat resistance between air and the fins. FIGS. 2a and 2b show a conventional example of an improved heat exchanger, FIG. 2a being a top plan view of a flat fin, and FIG. 2b being a cross-sectional view taken along the line IIb—IIb in FIG. 2a. In the drawings, reference numeral 4 denotes heat transfer tubes; 5 fin collars; 6 a fin; 7a-7h cutouts; and 8 an air flow. The multiplicity of cutouts 7a-7h are provided alternately on the front and rear sides of the fin 6 such as to be located between adjacent heat transfer tubes 4 in a vertical direction. In this case, thin temperature boundary layers are produced on the multiplicity of cutouts 7a-7h, respectively, and an improvement in the heat transfer performance can be made by the so-called temperature boundary layer front-edge effect.

However, if the heat transfer capability of local portions of the fin configuration shown in FIGS. 2a and 2b is examined elaborately, the cutouts 7a, 7b on the upstream side of the air flow 8 exhibit a large boundary layer front-edge effect and a high heat transfer capability, while air having been subjected to heat-exchange in advance by the cutouts 7a, 7b on the upstream side of the air flow 8 is not mixed with the other air and flows to the cutouts 7c-7h on the downstream side of the air flow 8. More specifically, since the cutouts 7c-7h lie inside of a temperature boundary layer generated by the cutouts 7a, 7b, the heat transfer performance is not so good. In addition, a dead water zone is produced downstream of the heat transfer tube 4 with respect to the air flow 8, into which zone air does not flow, and in which zone the heat transfer performance is poor. For these reasons, no remarkable improvements have hitherto been found in the heat transfer performance.

SUMMARY OF THE INVENTION

Accordingly, an object of the present invention is to remarkably reduce a heat resistance between air and fin surfaces by prompting mixture of air at cutouts and by adopting a fin configuration which will reduce a dead water zone produced downstream of heat transfer tubes with respect to air flow.

Another object of the present invention is to facilitate maintenance of molds for cutouts by making the shape of the plurality of cutouts identical or by making the shape of groups of a plurality of cutouts identical.

To this end, according to the present invention, there is provided a heat exchanger having a plurality of flat fins which are disposed at predetermined intervals and in parallel with each other and are adapted to allow the air to flow therebetween and a plurality of heat transfer tubes inserted orthogonally into the flat fins, a plurality of cutouts including two openings opposing the direction of the air flow and two legs nonparallel with said direction of the air flow are disposed on the front and reverse sides of the flat fin such as to be alternately adjacent to each other, thereby forming a plurality of groups of cutouts, the plurality of cutouts or the plurality of groups of cutouts being of the same configuration.

BRIEF DESCRIPTION OF THE DRAWINGS

FIG. 2b is a cross-sectional view taken along the line IIb—IIb in FIG. 2a;

DESCRIPTION OF THE PREFERRED EMBODIMENTS

Figure 1:
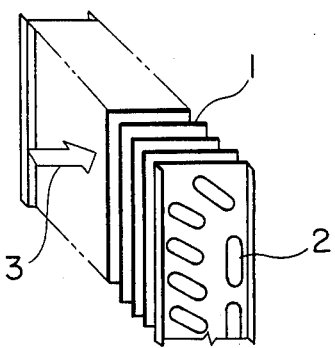
FIG. 1 is a perspective view of a conventional heat exchanger.
Figure 2A:
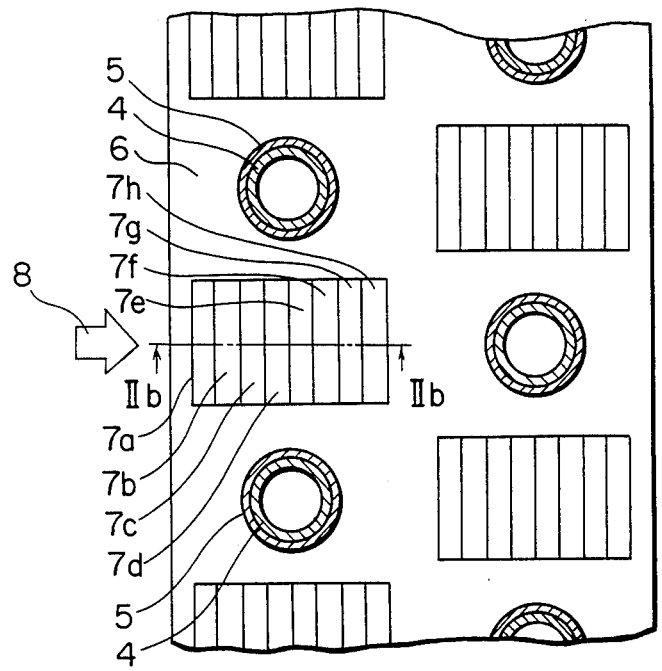
FIG. 2a is a top plan view of a conventional improved heat exchanger.
Figure 2B:
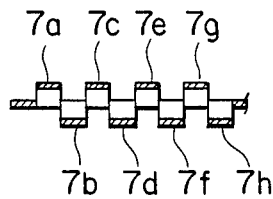
Figure 3:
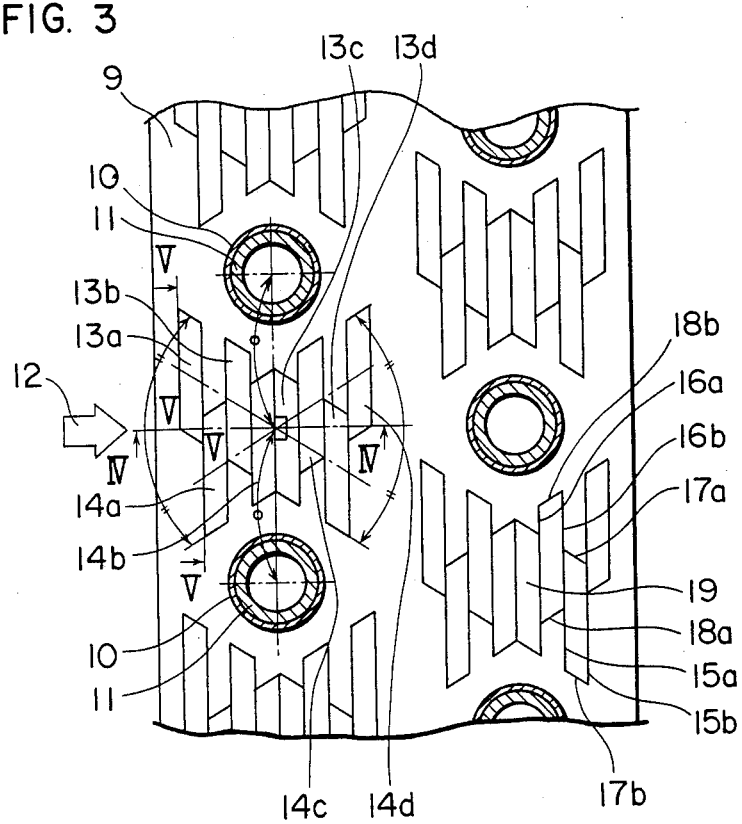
FIG. 3 is a top plan view of a fin of a heat exchanger according to a first embodiment of the present invention.
Figure 4:
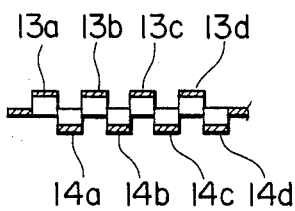
FIG. 4 is a cross-sectional view taken along the line IV—IV in FIG. 3.
Figure 5:
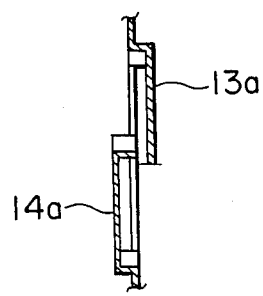
FIG. 5 is a cross-sectional view taken along the line V—V—V—V in FIG. 3.

Referring now to FIGS. 3 to 5 inclusive, description will be made hereinafter of a first embodiment of the present invention.

FIG. 3 is top plan view of a fin in a heat exchanger according to a first embodiment of the present invention; FIG. 4 is a cross-sectional view taken along the line IV—IV in FIG. 3; and FIG. 5 is a cross-sectional view taken along the line V—V—V—V in FIG. 3.

As shown in FIG. 3, heat transfer tubes 11 are inserted in fin collars 10 which are formed in a fin 9 at predetermined intervals by burring, and air flows in the direction indicated by an arrow 12.

A plurality of cutouts 13a–13d are provided and protrude on the front side of the fin 9 to be located between two adjacent (as viewed in FIG. 3) heat transfer tubes in the vertical direction, in wihch two sides of each cutout 13a–13d parallel to a straight line connecting the centers of the heat transfer tubes 11 in the vertical direction serve as openings 15a, 15b, while the other two sides of each cutout 13a–13d constitute legs 17a, 17b disposed on two parallel, straight lines inclined relative to the direction of the air flow 12. In addition, a plurality of cutouts 14a–14d are provided to protrude on the reverse side of the fin 9, in which two sides of each cutout 14a–14d parallel to a straight line connecting the contents of the heat transfer tubes 11 in the vertical direction serve as openings 16a, 16b, while the other two sides of each cutout constitute legs 18a, 18b disposed on two straight lines such that both the latter and the two straight lines on which the legs 17a, 17b of the cutouts 13a–13d are disposed on the front side are symmetrical with respect to a vertical bisector of the line connecting the centers of the two adjacent heat transfer tubes 4 in the vertical direction. Groups of cutouts 19 are thus arranged such that the front-side cutouts 13a–13d and the rear-side cutouts 14a–14d are disposed alternately adjacent to one other. The point of intersection between a straight line connecting the respective central points of the front-side cutouts 13a–13d and a straight line connecting the respective central points of the rear-side cutouts 14a–14d is located on a line connecting the respective centers of the two adjacent heat transfer tubes 11 between which the group of cutouts 19 is disposed.

According to the above-described arrangement:

(1) Since the open sides 15a, 15b and 16a and 16b of the cutouts are disposed in an offset manner with respect to each other, a portion of the cutout downstream of the air flow is located outside of a temperature boundary layer generated by the cutout upstream of the air flow, so that the heat transfer performance in that portion becomes favorable.

(2) Since the group of cutouts 19 is disposed angularly with respect to the direction of the air flow 12, the direction of the air flowing through the inside of the cutouts 13a–13d, 14a–14d differs from that of the air flowing outside said cutouts, and slippage is produced between the two types of air flow, resulting in turbulence. This turbulence serves to break the temperature boundary layer produced at the cutouts 13a–13d, 14a–14d, thereby improving the heat transfer performance of the fins.

(3) Since the legs 17a, 17b, 18a, 18b of the cutouts are disposed angularly with respect to the direction of the air flow 12, an air flow having a whirling component is induced by the secondary flow. This air flow brings about (i) an effect of allowing the air having been subject to heat-exchange upstream of the air flow to be mixed with fresh air, and (ii) an effect of reducing the area of the dead water zone produced downstream of the heat transfer tube 11 as viewed in the direction of the air flow.

It becomes possible to substantially reduce the heat resistance between the air and the fin surfaces by virtue of these advantages.

In addition, since the cutouts 13a–13d and 14a–14d can be formed by a mold of the same configuration, maintenance of the mold can be facilitated.

Next, a heat exchanger according to a second embodiment of the present invention will be described with reference to FIGS. 6 and 7.

Figure 6:
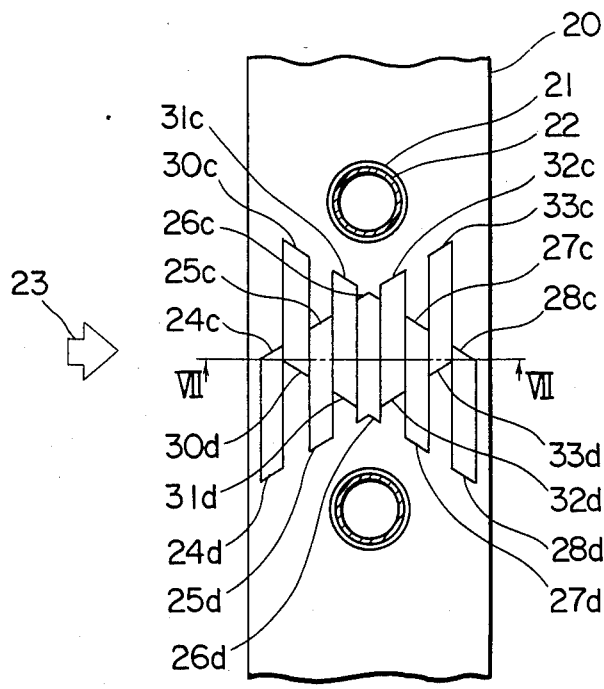
FIG. 6 is a top plan view of a fin of a heat exchanger according to a second embodiment of the present invention.
Figure 7:
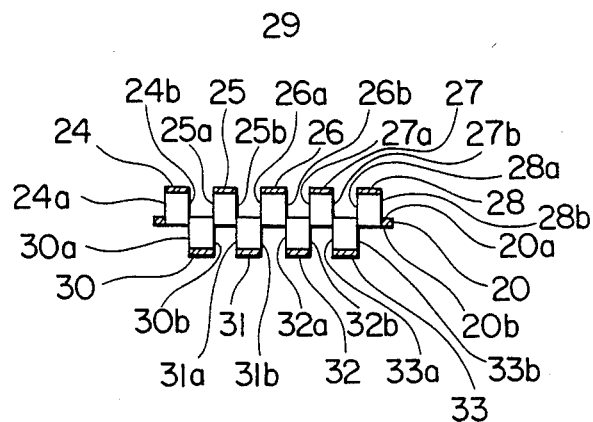
FIG. 7 is a cross-sectional view taken along the line VII—VII in FIG. 6.

FIG. 6 is a top plan view of a fin of a heat exchanger according to a second embodiment of the present invention, and FIG. 7 is a cross-sectional view taken along the line VII-VII in FIG. 6.

As shown in FIG. 6, heat transfer tubes 22 are fitted in fin collars 21 formed by burring at intervals in a fin 20, and air flow 23 flows in the direction indicated by an arrow 23.

A group 29 of cutouts 24–28 having openings 24a–28a and 24d–28d facing an air flow 23 and legs 24c–28c and 24d–28d is provided on a front side 20a of a fin 20 such that a line passing through the legs 24c, 25c and 26c and a line passing through the legs 24d, 25d and 26d, respectively, are angularly symmetrical with a line passing through the legs 26c, 27c and 28c and a line passing through the legs 26d, 27d and 28d, respectively, about a line connecting the center of heat transfer tubes 22 in the vertical direction. Also, a group 34 of cutouts 30–33 having openings 30a–33a and 30b–33b facing the air flow 23 and legs 30c–33c and 30d–33d is provided on the rear side 20b of the fin 20 such that a line passing through the legs 30c and 31c and a line passing through the legs 30d and 31d are angularly symmetrical with a line passing through the legs 32c and 33c and a line passing through the legs 32d and 33d about a line connecting the centers of the heat transfer tubes 22 in the vertical direction.

Furthermore, a line connecting the central points of the cutouts 24–28 on the front side of the fin and a line connecting the central points of the cutouts 30–33 on the rear side of the fin are disposed symmetrically about the perpendicular bisector of a segment connecting the centers of two vertically adjacent heat transfer tubes 22 with the groups of cutouts 29, 34 therebetween.

According to the above-described arrangement:

(1) Since the cutouts 24–28, 30–33 are provided to be offset with one another, a portion of the cutouts on downstream of the air flow is located outside a temperature boundary layer produced by the cutouts upstream of the air flow, so that the heat transfer performance in that portion becomes favorable.

(2) Since the groups of cutouts 29, 34 are angularly disposed with respect to the direction of the air flow 23, the direction of the air flowing through the inside of the cutouts 24–28, 30–33 differs from that of the air flowing outside said cutouts, slippage is produced between the two types of air flow, resulting in turbulence. This turbulence serves to break the temperature boundary layer generated by the cutouts 24–28, 30–33, thereby improving the heat transfer performance of the fins.

(3) Since the legs 24c–28c and 24d–28d of the cutouts 24–28 and 30–33, respectively, are angularly disposed with respect to the direction of the air flow 22, an air flow having a whirling component is induced by the secondary flow. This air flow brings about (i) an effect of allowing the air having been subjected to heat-exchange upstream of the air flow to be mixed with fresh air, and (ii) an effect of reducing the area of the dead water zone produced downstream of the heat transfer tube 11 as viewed in the direction of the air flow.

It becomes possible to substantially reduce the heat resistance between the air and the fin surfaces by virtue of these advantages.

In addition, since the cutouts 24, 25, 27, 28 and 30–33 can be formed by a mold of the same configuration, maintenance of the mold is facilitated.

Description of a third embodiment of the present invention will be made with reference to FIGS. 8 to 10.

Figure 8:
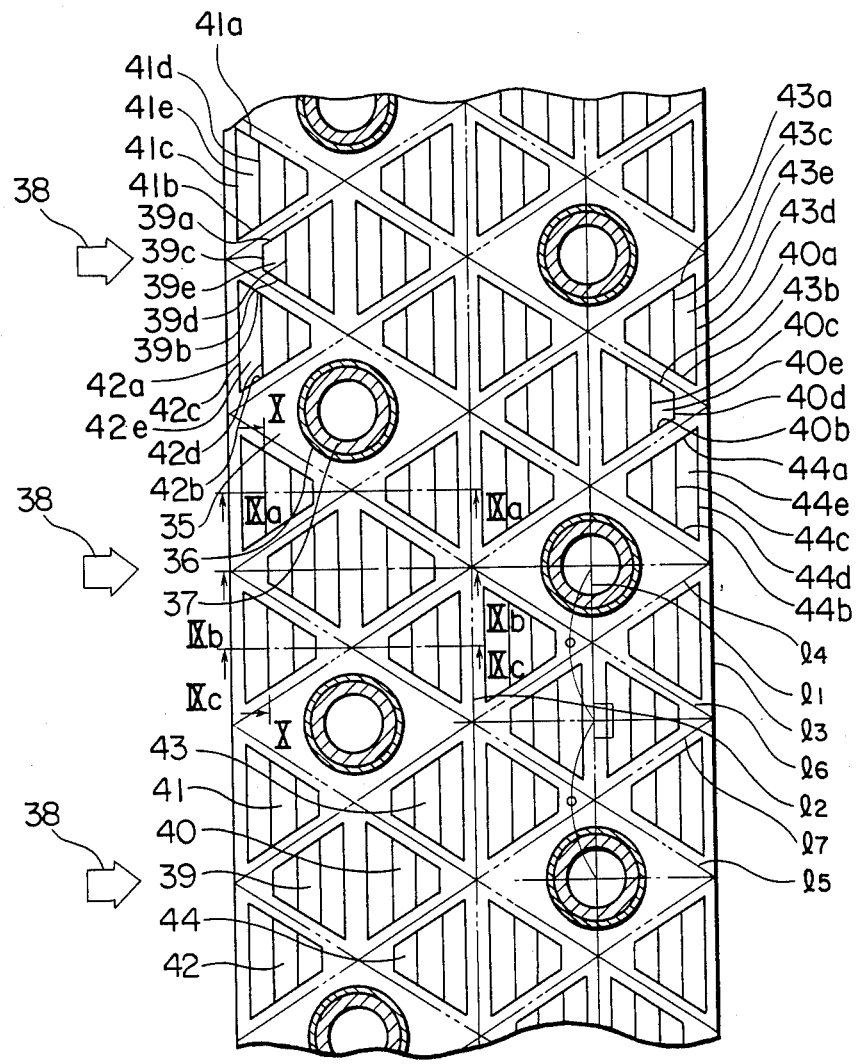
FIG. 8 is a top plan view of a fin of a heat exchanger according to a third embodiment of the present invention.
Figure 9A:
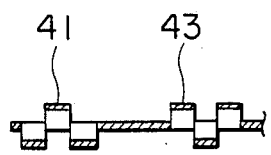
FIG. 9a is a cross-sectional view taken along the line IXa—IXa in FIG. 8.
Figure 9B:
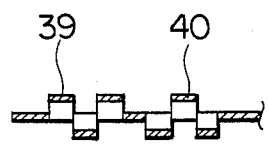
FIG. 9b is a cross-sectional view taken along the line IXb—IXb in FIG. 8.
Figure 9C:
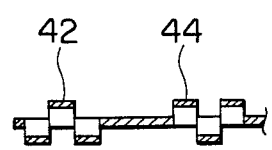
FIG. 9c is a cross-sectional view taken along the line IXc—IXc in FIG. 8.

FIG. 8 is a top plan view of a fin in heat exchanger according to third embodiment of the present invention;

FIG. 9a is a cross-sectional view taken along the line IXa—IXa in FIG. 8;

FIG. 9b is a cross-sectional view taken along the line IXb—IXb in FIG. 8;

FIG. 9c is a cross-sectional view taken along the line IXc—IXc in FIG. 8; and

Figure 10:
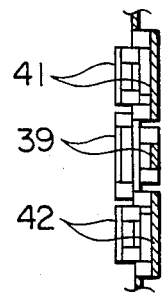
FIG. 10 is a cross-sectional view taken along the line X—X in FIG. 8.

FIG. 10 is a cross-sectional view taken along the line X—X in FIG. 8.

As shown in FIG. 8, heat transfer tubes 37 are fitted in fin collars 36 which are formed in a fin 35 at predetermined intervals by burring, and air flows in the direction indicated by an arrow 38.

The fin 35 has cutouts 39–44 in the inside of each of six congruent equilateral triangles which are formed by intersection of the following seven segments of lines a segment 11 of a line connecting the centers of two vertically adjacent heat transfer tubes 37; a segment 12 of a line which is parallel with the segment 11 and spaced from the segment 11 toward the upstream side by a distance equal to or less than half of a pitch of a row; a segment 13 of a line which is parallel with the line 11 and is spaced from the line 11 toward the downstream side by the same distance as that between the segment 11 and the segment 12; two segments 14 and 15 of a line which pass the point of intersection between the perpendicular bisector of the segment 11 and the segment 12, and form an angle $\theta$ (not orthogonal) relative to the segment 12, the segment 14 being closer to the upper heat transfer tube and the segment 15 being closer to the lower heat transfer tube; and two segments 16 and 17 of lines which pass the point of intersection between the perpendicular bisector of the segment 11 and the segment 13, and form an angle $\theta$ with the segment 13, the segment 16 being closer to the upper heat transfer tube and the segment 17 being closer to the lower heat transfer tube. In other words, a group 39 of cutouts is formed in a triangle formed by the intersection of the segments 11, 14 and 15; a group 40 of cutouts is formed, in a triangle formed by the intersection of the segments 11, 16 and 17; a group 41 of cutouts is formed in a triangle formed by the intersection of the segments 12, 14 and 16; a group 42 of cutouts is formed in a triangle formed by the intersection of the segments 12, 15 and 17; a group 43 of cutouts 43 is formed in a triangle formed by the intersection of the segments 13, 14 and 16; and a group 44 of cutouts is formed in a triangle formed by the intersection of the segments 13, 15 and 17, respectively.

A plurality of the groups 39–44 of cutouts are arranged such that each cutout has two legs which run parallel with the two equilateral sides of each equilateral triangle and two openings which run parallel with the other one side of each equilateral triangle, and such that cutouts are disposed to be adjacent to each other alternately on the front and reverse sides of the fin. In other words, the group 39 of cutouts includes a plurality of cutouts 39e which are provided on the front and reverse sides of the fin to be alternately adjacent to one another. Each cutouts 39e has as its legs a side 39a parallel with the segment 14 and a side 39b parallel with the segment 15 and also has as its openings two sides 39c, 39d parallel with the segment 11. Similarly, the group 40 of cutouts is constituted by a plurality of cutouts 40e each having legs 40a, 40b and openings 40c, 40d; the group 41 of cutouts by a plurality of cutouts 41e each having legs 41a, 41b and openings 41c, 41d; the group 42 of cutouts by a plurality of cutouts 42e each having legs 42a, 42b and openings 42c, 42d; the group 43 of cutouts by a plurality of cutouts 43e each having legs 43a, 43b and openings 43c, 43d; and the group 44 of cutouts 44 by a plurality of cutouts each having legs 44a, 44b and openings 44c, 44d. Accordingly, each group 39–44 of cutouts is formed in a trapezoidal shape.

According to the above-described arrangement:

(1) Since the legs 39a, 39b, 40a, 40b, 41a, 41b, 42a, 42b, 43a, 43b, 44a and 44b of the cutouts are angularly disposed with respect to the direction of the air flow 38, an air flow having a whirling component is induced by the secondary flow. This air flow brings about an effect of allowing the air having been subject to heat-exchange upstream of the air flow to be mixed with fresh air and prompts turbulence of the flow on the downstream side.

(2) The air flow having a whirling component and induced by the legs 41a, 42b of the cutout directly acts on the fin collar, and thereby improves the heat transfer performance in this portion.

(3) Since the air flow having a whirling component and induced by the legs 43a, 44b of the cutout reduces the dead water zone produced downstream of the heat transfer tube 37, the effective heat transfer area of the fin can be expanded.

(4) Since the groups 39, 43 and 44 of cutouts are formed in such a way that the width of the openings thereof 39c, 43c and 44c becomes larger toward the downstream side, a portion of the cutout downstream of the air flow lies outside a temperature boundary layer produced by the cutout upstream of the air flow, so that the heat transfer performance in that portion becomes favorable.

It becomes possible to substantially reduce the heat resistance between the air and the fin surfaces by virtue of these advantages.

In addition, since the groups 39–44 of cutouts can be formed by molds of the same configuration, respectively, maintenance of the molds can be facilitated.

Next, description of a fourth embodiment of the present invention will be made with reference to FIGS. 11 and 12.

Figure 11:
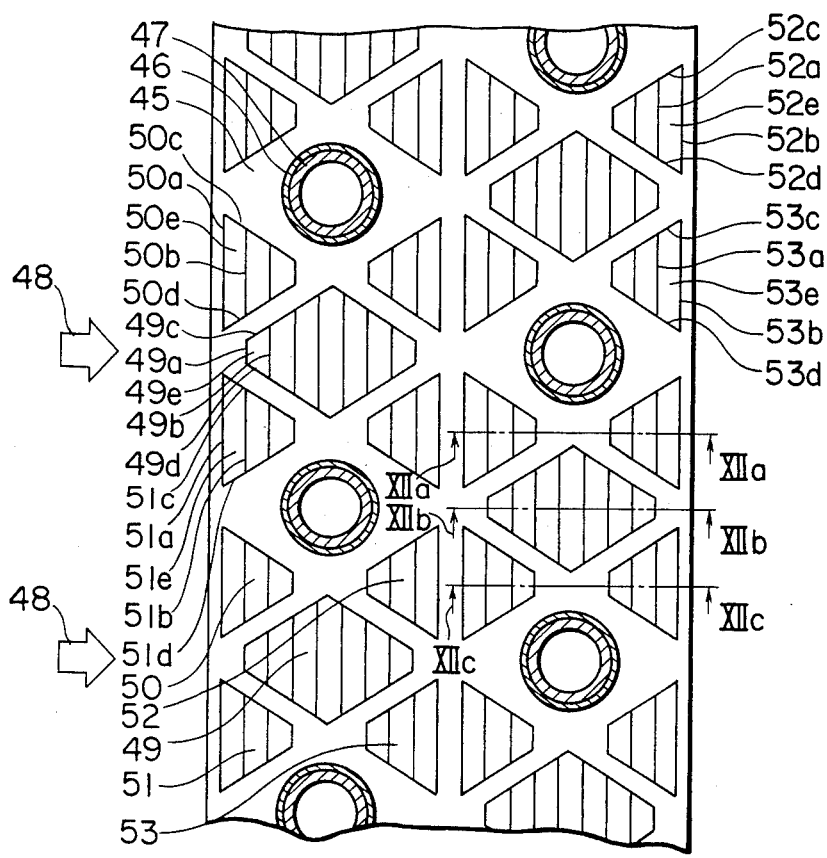
FIG. 11 is a top plan view of a fin of a heat exchanger according to a fourth embodiment of the present invention.
Figure 12A:
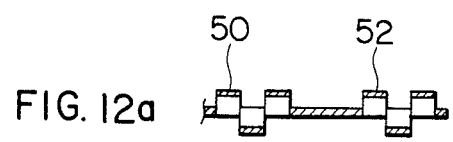
FIG. 12a is a cross-sectional view taken along the line XIIa—XIIa in FIG. 11.
Figure 12B:
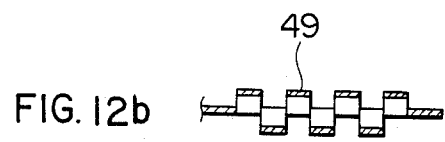
FIG. 12b is a cross-sectional view taken along the line XIIb—XIIb in FIG. 11.
Figure 12C:
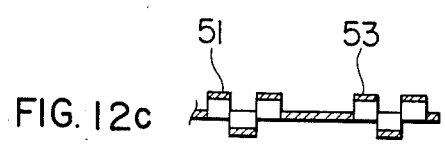
FIG. 12c is a cross-sectional view taken along the line XIIc—XIIc in FIG. 11.

FIG. 11 is a top plan view of a fin in a heat exchanger according to a fourth embodiment of the present invention;

FIG. 12a is a cross-sectional view taken along the line XIIa—XIIa in FIG. 11;

FIG. 12b is a cross-sectional view taken along the line XIIb—XIIb in FIG. 11; and FIG. 12c is a cross-sectional view taken along the line XIIc—XIIc in FIG. 11.

As shown in FIG. 11, heat transfer tubes 47 are fitted in fin collars 46 formed by burring at predetermined intervals in a fin 45, and the air flows in the direction indicated by an arrow 48.

The fin 45 includes, in a space between the two vertically adjacent heat transfer tubes 47, a substantially lozenge-shaped group 49 of cutouts, and trapezoidal groups 50-53 of cutouts formed in four spaces interposed between the substantially lozenge-shaped group 49 of cutouts and the two adjacent heat transfers 47 with the substantially lozenge-shaped group of cutouts 49 therebetween. Reference numeral 50 denotes an upper trapezoidal group of cutouts upstream of the air flow; 51 a lower trapezoidal group of cutouts upstream of the air flow; 52 an upper trapezoidal group of cutouts downstream of the air flow; and 53 a lower trapezoidal group of cutouts downstream of the air flow.

A plurality of the substantially lozenge-shaped groups 49 of cutouts and the four trapezoidal groups 50-53 of cutouts are provided such that cutouts, each of which is constituted by two openings extending transverse to the direction of the air flow 48 and two legs disposed nonparallel with the direction of the air flow 48 and extending at an angle with respect to the same, are provided on the front and reverse sides of the fin 45 to be disposed alternately adjacent to each other. In other words, the substantially lozenge-shaped group 49 of cutouts is formed by alternately providing on the front and reverse sides of the fin 45 to be adjacent to each other, a plurality of cutouts 49e, each cutout comprising an upstream-side opening 49a and a downstream-side opening 49b, both extending transverse to the direction of the air flow 48, and an upper leg 49c and a lower leg 49d which are not parallel with the direction of the air flow 48 but form an angle with respect to the same.

Similarly, the trapezoidal group 50 of cutouts is constituted by a plurality of cutouts 50e each having openings 50a, 50b and legs 50c, 50d; the trapezoidal group 51 of cutouts by a plurality of cutouts 51e each having openings 51a, 51b and legs 51c, 51d; the trapezoidal group 52 of cutouts by a plurality of cutouts 52e each having openings 52a, 52b and legs 52c, 52d; and the trapezoidal group 53 of cutouts by a plurality of cutouts 53e each having openings 53a, 53b and legs 53c, 53d.

According to the above-described arrangement:

(1) Since the legs 49c, 49d, 50c, 50d, 51c, 51d, 52c, 52d, 53c, and 53d of the cutouts are disposed at an angle with respect to the direction of the air flow 48, an air flow having a whirling component is induced by the secondary flow. This air flow brings about an effect of allowing the air having been subject to heat-exchange upstream of the air flow to be mixed with fresh air and prompts turbulence of the flow on the downstream side.

(2) The air flow having a whirling component and induced by the legs 50c, 51d of the cutout directly acts on the fin collar 46, and thereby improves the heat transfer performance in this portion.

(3) Since the air flow having a whirling component and induced by the legs 52c, 53d of the cutout reduces the dead water zone produced downstream of the heat transfer tube 47, the effective heat transfer area of the fin can be expanded.

(4) Since an upstream-side portion of the substantially lozenge-shaped groups 49 of cutouts and the trapezoidal groups 52 and 53 of cutouts are formed in such a way that the width of the openings thereof 49a, 52a and 53a becomes larger toward the downstream side, a portion of the cutout downstream of the air flow is located outside a temperature boundary layer generated by the cutout upstream of the air flow, so that the heat transfer performance in that portion becomes favorable.

It becomes possible to substantially reduce the heat resistance between the air and the fin surfaces by virtue of these advantages.

In addition, since the groups 39-44 of cutouts can be formed by molds of the same configuration, respectively, maintenance of the molds can be facilitated.

According to the present invention, cutouts opening in the direction of the air flow are disposed between the adjacent heat transfer tubes of the fin in such a manner that the legs of the cutouts form an angle with respect to the direction of the air flow. Consequently, a flow and, hence turbulence, having a whirling component in the air flowing between adjacent fins are induced. By making use of an air flow mixing effect, a turbulence promoting effect, a dead water zone reducing effect, and a boundary layer front-edge effect, it becomes possible to substantially reduce the heat resistance between the air and the fin surfaces. Thus, it becomes possible to allow the heat performance of the heat exchanger to be improved remarkably and to realize a compact and high-performance heat exchanger.

In addition, since the plurality of cutouts or groups of cutouts according to the present invention can be formed by molds of the same configuration, maintenance of the molds can be facilitated.

What is claimed is:

1. A heat exchanger comprising a plurality of flat fins which are disposed at predetermined intervals and in parallel with one another and are adapted to allow air to flow therebetween and a plurality of horizontally spaced groups of heat transfer tubes fitted orthogonally into said flat fins, respective transfer tubes forming each of said groups of heat transfer tubes being arranged to be disposed vertically one above the other and perpendicular to said flat fins and adapted to allow a fluid to pass therethrough, each group of said horizontally spaced groups having its transfer tubes spaced at substantially intermediate heights relative to the transfer tubes of the adjacent groups of transfer tubes, groups of cutouts being provided on front and reverse surfaces of said flat fins between vertically adjacent heat transfer tubes, said groups of cutouts being arranged such that a plurality of cutouts each having two openings extending transverse to a primary direction of air flow between said fins and (b) a pair of legs projecting non-parallel to the primary direction of said air flow are disposed on the front and reverse surfaces of each of said flat fins in a continuously alternating manner, one leg of said pair of legs being parallel to a line connecting centers of (a) a particular transfer tube adjacent the group of cutouts containing that one leg and (b) another particular transfer tubes and the other leg of the pair of legs being parallel to a line connecting centers of (a) said particular transfer tube and (b) a transfer tube in said adjacent group which is disposed immediately vertically adjacent and below said another particular transfer tube.

2. A heat exchanger according to claim 1, wherein a plurality of groups of cutouts are provided on said flat fin as between vertically adjacent heat transfer tubes.

3. A heat exchanger according to claim 2, wherein said groups of cutouts include substantially lozenge-shaped groups of cutouts provided on said flat fin as between said vertically adjacent heat transfer tubes.

4. A heat exchanger according to claim 3, wherein said groups of cutouts further include substantially trapezoidal-shaped groups of cutouts located along each side of the periphery of each of said substantially lozenge-shaped group of cutouts and said substantially lozenge-shaped groups of cutouts and said trapezoidal groups of cutouts are provided on said flat fin between said vertically adjacent heat transfer tubes.

5. A heat exchanger having a plurality of flat fins which are disposed at predetermined intervals and in parallel with one another and are adapted to allow the air to flow therebetween and a plurality of heat transfer tubes fitted orthogonally into said flat fins and arranged to be disposed vertically one above the other and perpendicular to said flat fins and adapted to allow a fluid to pass therethrough, said heat exchanger comprising a plurality of substantially lozenge-shaped groups of cutouts formed in each of said fins and having their respective diagonals disposed along a line connecting centers of vertically adjacent ones of said heat transfer tubes and a line forming the perpendicular bisector of said line connecting centers of vertically adjacent ones of said heat transfer tubes, each of said groups of cutouts comprising a plurality of cutouts each including (a) two openings extending transverse to a primary direction of air flow between said fins and (b) a pair of legs projecting nonparallel with the primary direction of said air flow, said plurality of cutouts of each of said groups of cutouts being disposed continuously on front and reverse sides of said flat fin to be alternately adjacent to each other.

6. A heat exchanger according to claim 5, wherein six trapezoidal groups of cutouts are provided the orientation of which differs alternately in the direction of the air flow.

7. A heat exchanger according to claim 6, wherein a substantially lozenge-shaped group of cutouts and a plurality of trapezoidal groups of cutouts respectively located along each side of the periphery of said substantially lozenge-shaped group of cutouts are provided on said flate fin as between vertically adjacent heat transfer tubes.

8. A heat exchanger having a plurality of glat fins which at predetermined intervals and in parallel with one another and are adapted to allow the air to flow therebetween and a plurality of heat transfer tubes fitted orthogonally into said flat fins and arranged to be disposed one above the other and perpendicular to said flat fins and adapted to allow a fluid to pass therethrough, said heat exchanger comprising a plurality of substantially lozenge-shaped groups of cutouts formed in each of said fins and having their respective diagonals disposed along a line connecting centers of vertically adjacent ones of said heat transfer tubes and a line forming the perpendicular bisector of said line connecting centers of vertically adjacent ones of said heat transfer tubes, a plurality of trapezoidal cutouts disposed such that a trapezoidal cutout is located along each side of the periphery of one of said substantially lozenge-shaped groups of cutouts upper and lower bottoms of each of said trapezoidal groups of cutouts being disposed substantially perpendicularly to a primary directon of air flow between said fins, oblique sides of each of said trapezoidal groups of cutouts being substantially parallel with a side of one of said substantially lozenge-shaped groups of cutouts, and said substantially lozenged-shaped groups of cutouts and said trapezoidal groups of cutouts comprising a plurality of cutouts each having (a) two openings opposing the primary direction of the air flow and (b) a pair of legs projecting nonparallel with the primary direction of said flow disposed continously on front and reverse sides of said flat fin to be alternately adjacent to each other.

9. A heat exchanger according to claim 4, wherein said heat transfer tubes are located within lozenge-shaped spaces formed between said groups of cutouts.

* * * * *